United States Patent [19]

Skala

[11] 4,340,111
[45] Jul. 20, 1982

[54] EVAPORATIVE COOLING OF CONTAINERS IN A PRESSURE VESSEL

[76] Inventor: Stephen F. Skala, 3839 S. Wenonah Ave., Berwyn, Ill. 60402

[21] Appl. No.: 140,618

[22] Filed: Apr. 15, 1980

Related U.S. Application Data

[63] Continuation-in-part of Ser. No. 299,294, Oct. 4, 1972, Pat. No. 3,888,303, and a continuation-in-part of Ser. No. 569,354, Apr. 18, 1975, abandoned, and a continuation-in-part of Ser. No. 769,389, Feb. 16, 1977, abandoned, and a continuation-in-part of Ser. No. 941,123, Sep. 11, 1978, Pat. No. 4,246,955.

[51] Int. Cl.³ .............................................. F25B 13/00
[52] U.S. Cl. ............................................ 165/2; 165/61; 99/470; 62/119; 62/316
[58] Field of Search ................. 165/2, 12, 61, 104.26, 165/104.27, 104.21; 219/440; 99/330, 467, 470; 62/119, 315, 316, 514 R

[56] References Cited

U.S. PATENT DOCUMENTS

| | | | |
|---|---|---|---|
| 2,472,362 | 6/1949 | Barnebey et al. | 165/2 |
| 2,985,707 | 5/1961 | Ahearn et al. | 165/104.26 |
| 3,174,540 | 3/1965 | Dutton | 165/104.21 |
| 3,371,298 | 2/1968 | Narbut | 165/104.21 |
| 3,818,818 | 6/1974 | Hice | 99/330 |
| 3,887,759 | 6/1975 | Staub et al. | 165/104.26 |
| 3,948,244 | 4/1976 | Lazaridis et al. | 165/104.26 |
| 4,129,014 | 12/1978 | Chubb | 165/104.26 |

Primary Examiner—Albert W. Davis
Assistant Examiner—Margaret A. Focarino
Attorney, Agent, or Firm—Stephen E. Skala

[57] ABSTRACT

A working fluid condensate cools hot containers within a pressure vessel in a process which includes condensing vapors of the working fluid on a cool surface within the pressure vessel and transporting the condensate onto the hot containers for vaporization therefrom to continue the process cyclically. In one embodiment, the condensate is transported by capillary flow through a wick which covers a portion of the container. In alternative embodiments, the condensate is transported from the cool surface to the hot containers by flow induced by gravity, pumps, or centrifugal force.

The invention is applied to food processing in a pressure environment. For cleaning convenience, the food is confined to containers, yet short processing times are provided by condensation and vaporization of water as a working fluid which effectively exchanges heat between the containers and heat exchange surfaces within the pressure vessel. The heat exchange surfaces are heated and cooled by a thermal exchanger fluid which exchanges heat with thermal reservoirs to provide large peak thermal capacity for heating and cooling phases of a cooking process.

40 Claims, 4 Drawing Figures

EVAPORATIVE COOLING OF CONTAINERS IN A PRESSURE VESSEL

BACKGROUND

This application is a continuation-in-part of Ser. No. 299,294 filed Oct. 4, 1972 and now U.S. Pat. No. 3,888,303; and Ser. No. 569,354 filed Apr. 18, 1975 and now abandoned; and Ser. No. 769,389 filed Feb. 16, 1977 and now abandoned; and Ser. No. 941,123 filed Sept. 11, 1978, now U.S. Pat. No. 4,246,955.

This invention relates to cooling by vaporization of a working fluid and particularly to such cooling of containers within a pressure vessel having therein a cool surface on which to condense the working fluid for subsequent transport to the containers which enables rapid removal of the containers from the pressure vessel and of substances from the containers.

A principal area for application of the invention is rapid cooling of hot food containers in a pressure cooking appliance to complement rapid heating by vapor condensation. Rapid heating and cooling are desirable characteristics of domestic food processing. In a domestic appliance system disclosed by the applicant, appliance units exchange heat with thermal reservoirs by means of a liquid phase thermal exchange fluid. The thermal reservoirs provide large peak thermal capacity and exchange heat effectively with the appliances. The pressure cooking appliance, being an installed unit having fluid and electrical inputs and outputs to provide a broad range of food processing environments, does not process foods in direct contact with the pressure vessel but rather processes non-solid foods in passive containers. The containers are handled conveniently and are cleaned easily after cooking, but heat exchange between the containers and appliance by convection of gases within the pressure vessel is undesirably slow for many applications.

PRIOR ART

Heat transfer based on latent heat of transition between liquid and gaseous phases of a working fluid is well known and illustrates principles applied to the invention.

Devices known as heat pipes have high rates of heat transfer at predetermined temperatures for which a working fluid is selected. A heat pipe comprises a sealed enclosure containing the working fluid and a wick to transport working fluid condensate. A heat source at a temperature sufficiently high to vaporize the working fluid contacts an external portion of the enclosure and a heat sink at a temperature sufficiently low to condense the working fluid contacts another external portion of the enclosure thereby providing a hot surface and a cool surface within the enclosure. The working fluid vaporizes at the hot surface and condenses on the cool surface to transfer heat. The condensate at the cool surface flows back to the hot surface in a continuing cycle while the heat source and heat sink are present. A heat pipe, however, does not provide a suitable heat transfer configuration for food containers which are themselves within an enclosure rather than external to the enclosure. Further, the food containers function alternately as a heat source and sink as they are cooled and heated during a cooking process. Additionally, although a wick is used in one embodiment of the invention, other means are used to transport condensate in alternative embodiments.

Double boiler type pressure cookers wherein suspended containers are heated by condensation of steam have been used for canning of food but cooling is undesirably slow.

Food in conventional pressure cookers can be cooled rapidly by flowing cold water over the pressure vessel. Cooled surfaces within the pressure vessel condense steam which reduces pressure to cause boiling and cooling of fluid portions of contained food. Such cooling, however, is not effective when the food is in a closed container to preclude release of the food into a pressure cooking appliance.

Solid food in a pressure vessel has been rapidly cooled by spraying liquid nitrogen directly onto the food but coolants such as liquefied gases under high pressure are unsuitable for domestic use. Alternatively, solid food is rapidly cooled by a spray of cold water from a source external to the pressure vessel as is disclosed by J. O. Hice in U.S. Pat. No. 3,672,908. Spraying or fogging of solid foods, such as various meats, was shown to alter the food surface desirably to reduce moisture loss during subsequent cooling at lower pressure. Although the pressure cooking appliance described herein could be adapted to attain such effects for unenclosed solid foods, spraying without repeated use of condensate for evaporative cooling according to the invention would result in substantial accumulation of water in the pressure vessel. Further, spraying does not provide a type of cooling used to advantage in the preferred embodiment of the invention wherein only lower portions of a container are cooled thereby avoiding frothing or explosive expansion which is an undesirable effect in some foods when pressure is decreased rapidly as steam condenses above the food in a container.

OBJECTS OF THE INVENTION

It is a general object to provide an improved process and apparatus for cooling hot containers in a pressure vessel for rapid and convenient removal.

It is another object to provide the cooling of hot containers by vaporizing a working fluid condensate therefrom and to condense vapors of the working fluid within the pressure vessel for repeated vaporization from the containers.

It is yet another object to heat the containers by condensation of the same working fluid used to cool the containers by vaporization.

It is still another object to apply the heating and cooling of containers by condensation and vaporization of a working fluid to a pressure cooking appliance thereby providing rapid processing of food under pressure in containers with convenient handling and cleanup.

It is still another object to include a pressure cooking appliance of the kind described in a domestic appliance system having thermal reservoirs to complement the effective heat transfer by condensation and vaporization of a working fluid with large peak thermal capacity.

SUMMARY OF THE INVENTION

These and other objects and advantages which will become apparent are provided by the invention wherein a vapor of a working fluid is condensed to a liquid condensate on a cool surface within a pressure vessel for transport of the condensate to hot containers also within the pressure vessel. The condensate vaporizes from the containers to absorb heat and condenses again on the cool surface to release the heat in a cyclic process of heat transfer. Embodiments include transport of the condensate by capillary flow through a wick and by flow induced by gravity, pumps, or centrifugal force. The pressure vessel and containers are openable for convenient processing of substances therein.

The containers typically are heated by condensation of working fluid which was vaporized by a hot surface within the pressure vessel during a heating phase which preceeded the cooling phase. Both heating and cooling of the containers are thereby effective heat transfer processes using latent heat of transition between liquid and vapor phases of a working fluid.

The invention is applied to pressure cooking appliances where food is processed within containers for convenient handling and cleanup. The cooling by vaporization complements heating by condensation to process food rapidly even though it is in containers and not in direct contact with appliance heat exchange surfaces. The effective heat transfer between appliance heat exchange surfaces and the food containers by a working fluid uses to advantage thermal sources of high peak capacity and low thermal impedence which are provided by thermal reservoirs and thermal exchange fluid circuits. A liquid phase thermal exchange fluid is forced to circulate in the fluid circuits in paths which include heat exchangers in the pressure cooking appliance and in the thermal reservoirs which comprise a cold reservoir at a temperature of about $-30°$ C., an auxiliary heat sink at ambient temperature, and a hot reservoir at about 300° C. The appliances include selector and regulator valves which control flow of the thermal exchange fluid to attain programmed appliance temperatures. The pressure cooking appliance does not contain active sources of heat or cold but is a passive unit in a system of domestic appliances sharing the fluid circuits and thermal reservoirs.

A pressure cooking appliance in the appliance system which uses a wick to transport working fluid condensate includes a passive pressure food container having a wick covering its side and bottom portions. The container is placed in a pressure vessel of the pressure cooking appliance, water as the working fluid is added to assure saturation of the wick, and the pressure vessel is closed. Hot thermal exchange fluid flows through a heat exchanger which is a chamber adjacent to the bottom of the pressure vessel, the pressure vessel is vented momentarily to expel air, and the container is heated for a predetermined time by condensing steam. During a subsequent cooling phase, cool thermal exchange fluid flows through the chamber to provide a cool surface within the pressure vessel on which the steam condenses. Water condensate flows into the wick where it is vaporized by the hot container and is again condensed on the cool surface. After a time sufficient to cool the food below the atmospheric boiling point of water, air is admitted into the pressure vessel to enable removal of the container. The transport of working fluid condensate by a wick is preferred for its cooling of the bottom and side portions of the food container. Foods having a fluid component are cooled by convection while the upper portion of the container remains hot to maintain steam pressure. Food is not subjected to frothing or explosive expansion which may occur if pressure is reduced while food substances are above their boiling temperatures. For other foods and substances, or where pressure is controlled independently of temperature, alternative embodiments for transporting working fluid condensate to various portions of the container by jets, sprays, or drops are provided.

In one alternative embodiment, the working fluid condenses on a cool surface of a heat exchanger positioned above a slowly rotating fan which projects drops of condensate into trajectories which include a substantial portion of the containers. In another alternative embodiment, the condensate is pumped through orifices to project upon the containers. In yet another alternative embodiment, condensate flows down a cool surface to drop upon a container.

DESCRIPTION OF THE DRAWINGS

FIG. 1 shows evaporative cooling of a hot container in a pressure vessel enclosure wherein a working fluid is condensed on a cool surface for transport to the container by a wick. A thermal exchange fluid flows in selected paths which include a pressure cooking appliance and a plurality of thermal reservoirs. Heat is exchanged by means of the thermal exchange fluid to attain predetermined hot and cold temperatures in the pressure cooking appliance.

Figure 1:
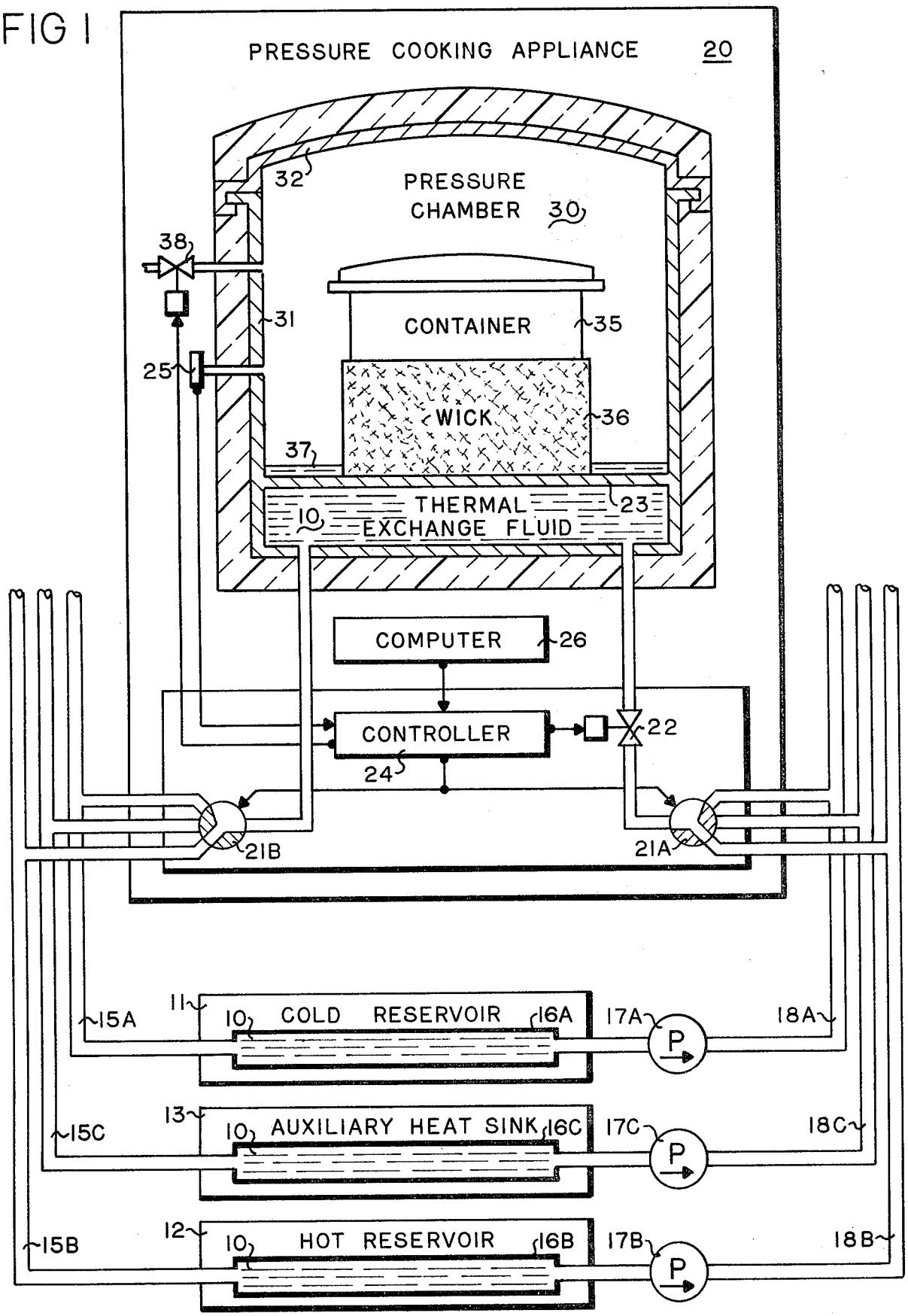
FIG. 1 is a schematic drawing partly in side cross section of the preferred embodiment showing a pressure vessel having a bottom portion heat exchanger to provide a cool surface for condensing working fluid vapor and a wick to transport condensate onto a container according to the invention. A fluid circuit containing a thermal exchange fluid couples thermal reservoirs and the heat exchanger for heat exchange.

A liquid phase thermal exchange fluid 10 can exchange heat with a cold reservoir 11, a hot reservoir 12, and an auxiliary heat sink 13. The cold reservoir stores thermal energy as latent heat of crystallization in an aqueous solution of ethylene glycol or other substance having a phase transition temperature of about $-30°$ C. The hot reservoir stores thermal energy in an alkali hydroxide or other substance having substantial heat of fusion at a melting temperature of about 300° C. The auxiliary heat sink is at the temperature of a water preheater, ambient outside air, or other heat sink at a moderate temperature. The thermal exchange fluid flows in a fluid circuit which includes heat exchangers in the thermal reservoirs, pumps, and supply and return main pairs through which the thermal exchange fluid can flow under a differential pressure. A plurality of appliances, of which only the pressure cooking appliance is shown, connect to the supply and return main pairs to complete the fluid circuit. A portion of the fluid circuit which provides cold thermal exchange fluid includes a return main 15A, a heat exchanger 16A in the cold reservoir, a motor operated pump 17A to develop a differential pressure, and a supply main 18A. Similarly, a portion of the fluid circuit which provides hot thermal exchange fluid comprises a return main 15B, a heat exchanger 16B in the hot reservoir, a motor operated pump 17B, and a supply main 18B. A portion of the fluid circuit which provides thermal exchange fluid at a moderate temperature comprises a return main 15C, a heat exchanger 16C in the auxiliary heat sink, a motor operated pump 17C, and a supply main 18C.

The fluid circuit is completed by pressure cooking appliance 20 which selectively connects to the supply and return main pairs for admission of the thermal exchange fluid at a differential pressure. The appliance 20 provides heating and cooling functions by positioning valves to select and regulate flow of thermal exchange fluid from the thermal reservoirs. Selector valves 21A and 21B operate together to select flow from the supply and return main pairs. Flow of thermal exchange fluid is modulated by regulator valve 22. When the regulator valve is open, thermal exchange fluid flows from a selected supply main, through selector valve 21A, through regulator valve 22, through appliance heat exchanger 23 which is a double walled chamber having a portion of a pressure vessel as one wall, and through selector valve 21B to the return main. The selector and regulator valves each have a motor operator which functions according to known servo system principles in response to power from controller 24. The controller is responsive to temperature or pressure information from sensor 25 to position the selector and regulator valves to attain setpoint temperature or pressure levels received from computer 26.

Heat is exchanged between thermal exchange fluid in appliance heat exchanger 23 and pressure chamber 30 to attain programmed temperatures or pressures. A pressure vessel 31 and a securable lid 32 comprise the pressure chamber enclosure within which food in a container 35 is processed by heating and cooling. The pressure cooking system provides a high rate of heat transfer between the container and the thermal reservoirs through the thermal exchange fluid and appliance heat exchanger. Accordingly, it is properly applied to processing of food substances which can themselves be rapidly heated and cooled within the container. Such foods include fluid substances such as soups or stews. To contain such fluids during a cooling phase at low pressure, container 35 preferably is a pressure container such household pressure cookers which are normally heated on stoves. The container 35 is partly covered by a wick 36 which extends to the bottom of the pressure vessel to absorb water condensate 37 for transport by capillary action up the sides of the container.

A representative cooking process illustrates operation of the pressure cooking appliance. Ingredients for a stew are placed in container 35 and its lid is secured. The container with its wick is placed in the pressure chamber. A quantity of water at least sufficient to saturate the wick is added to the pressure chamber and lid 32 is secured. The computer is programmed to provide temperature setpoints at predetermined times to the controller. The controller provides power to position selector valves 21A and 21B to allow flow of hot thermal exchange fluid between the hot supply and return mains 18B and 15B. The water vaporizes and condenses on the container for enhanced heating. For subsequent cooling below the atmospheric boiling point of water, valve 38 is opened momentarily to allow removal of air from the pressure chamber. After a predetermined time, the selector valves 21A and 21B are positioned for flow of thermal exchange fluid at a moderate temperature between the supply and return mains 18C and 15C. Steam condenses on the cooled bottom surface of the pressure vessel, the water condensate is absorbed by the wick from which it is vaporized to steam by the hot container, and the steam condenses again on the cooled bottom surface to continue the rapid cooling until the container attains the boiling temperature of water at the pressure of the pressure vessel. The container is cooled to a programmed temperature by prior control during the heating phase of the partial pressure of air by venting. For rapid cooling to low temperature, substantially all air is vented and the selector valves 21A and 21B are positioned for flow of cold thermal exchange fluid between supply and return mains 18A and 15A. Valve 38 is opened to equilibrate pressure in the pressure vessel to atmospheric, lid 32 is opened, the container is removed and opened for addition of ingredients requiring lesser cooking time, and the container is placed back in the pressure vessel to repeat the process just described. The food is then ready for serving.

Convenient access to a cold reservoir allows food to be prepared and stored at low temperature for later unattended cooking. During a cooling phase, it is usually preferable to select the auxiliary heat sink rather than the cold reservoir since it provides cooling sufficient to open the pressure vessel and the container without expenditure of energy for refrigeration. Compared to conventional pressure cookers, transfer of appliance heat to an auxiliary heat sink reduces air conditioner load in warm weather and reduces release of water vapor and cooking odors into a kitchen.

An example of a suitable liquid phase thermal exchange fluid is the aromatic hydrocarbon "Therminol 60" manufactured by Monsanto Corporation which has the following properties: an operating range of $-50°$ C. to $315°$ C., a pour point of $-60°$ C., a specific heat of 0.5, and a vapor pressure of one atmosphere at $315°$ C. It has an auto-ignition temperature of $480°$ C. and is classified as practically non-toxic based on vapor inhalation and oral and skin absorption studies.

A more detailed description of the thermal reservoirs and other apparatus related to the fluid circuits commonly shared by the appliances may be found in the following U.S. Pat. Nos. issued to me: 4,164,253 and 4,173,993.

A description of other appliance units based on a thermal exchange fluid may be found in the following U.S. Pat. Nos. issued to me: 4,024,904, 4,156,454, and 4,188,794.

Figure 2:
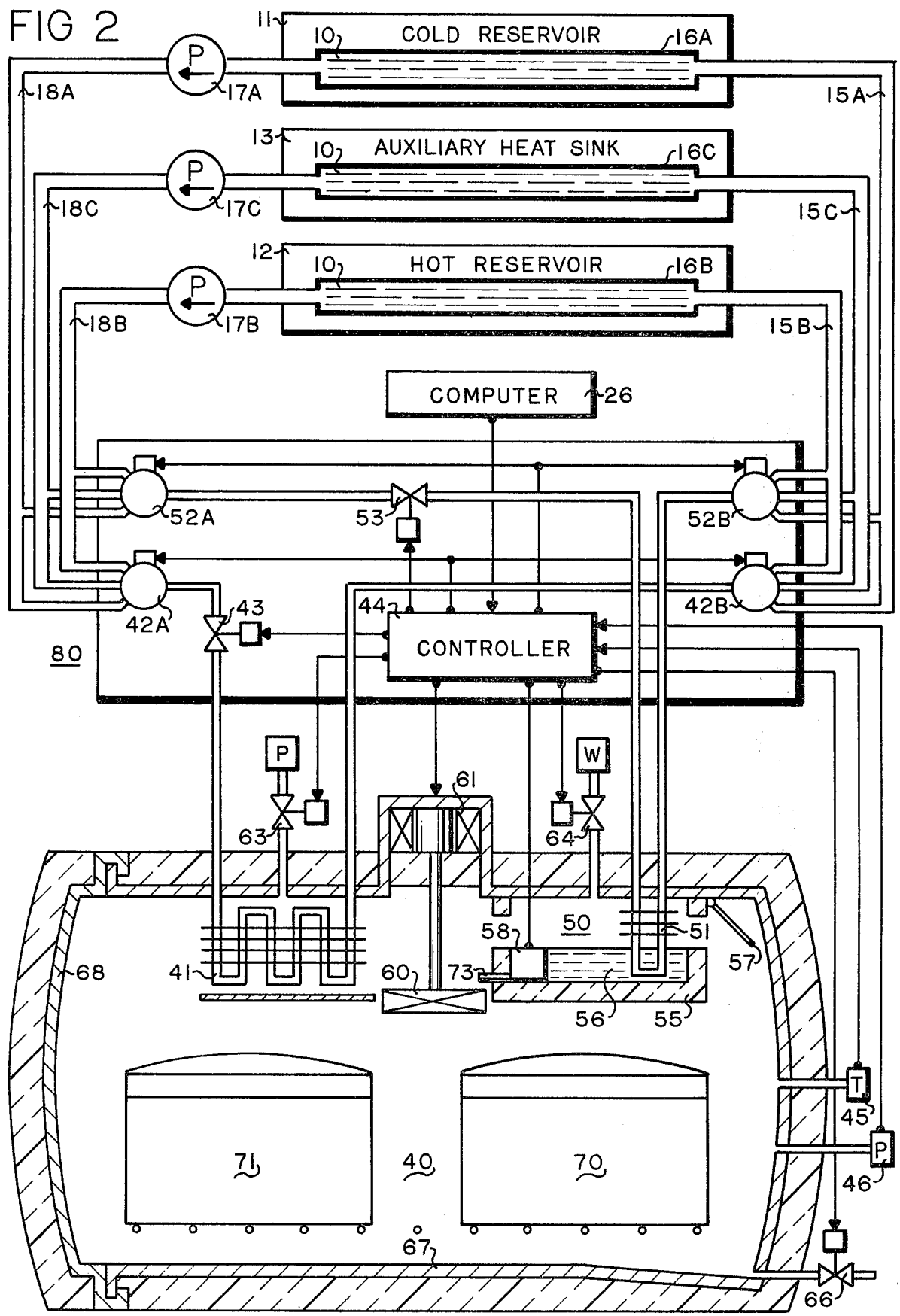
FIG. 2 is a schematic drawing partly in side cross section of an alternative embodiment showing a pressure vessel having a heat exchanger which can be cooled to condense working fluid vapor and transport of the condensate to containers by flow induced by centrifugal force from a rotating fan.

FIG. 2 shows evaporative cooling of hot containers in a pressure vessel enclosure wherein a working fluid is condensed on a cool surface and the condensate flows into a rotating fan for projection into trajectories which include substantial portions of the containers from which the condensate vaporizes.

A system of thermal reservoirs and pumps comprises a portion of a fluid circuit which delivers hot and cool thermal exchange fluid under a differential pressure to appliances as was described with reference to FIG. 1.

The circuit is similarly completed by a pressure cooking appliance through selector and regulator valves and heat exchangers. One or more heat exchangers are used to provide desired food processing environments. The embodiment of FIG. 2 includes two heat exchangers which operate independently to provide a full range of hot and cold temperatures together with controlled addition or removal of water vapor. Temperature, pressure, and gaseous components in the pressure chamber are controlled as described in copending application Ser. No. 941,123. In particular, the working fluid is condensed and the condensate is available for transport to the containers for cooling according to the invention.

Pressure chamber 40 of the pressure cooking appliance is heated and cooled by a primary heat exchanger 41 which receives a flow of thermal exchange fluid under a differential pressure from thermal sources selected by selector valves 42A and 42B and regulated by regulator valve 43. The selector and regulator valves each have a motor operator which is responsive to power from controller 44. The controller is responsive to temperature information from sensor 45 and to pressure information from sensor 46 which are compared to temperature and pressure setpoints from computer 26 to position the selector and regulator valves so that the setpoints are attained.

Vapor pressure control assembly 50 includes a secondary heat exchanger 51 which receives a flow of thermal exchange fluid through selector valves 52A and 52B and regulator valve 53 which are responsive to power from the controller. The vapor pressure control assembly also includes a thermally insulated condensate tray 55 containing condensate 56, a barometrically operated damper 57, and a condensate flow controller 58.

Forced convection in the pressure chamber and through the vapor pressure control assembly 50 is provided by a fan 60 which is driven by a reversible variable speed motor 61. Pressure within the pressure chamber is controlled independently of temperature by pressure regulator valve 63 which controls flow of gases to or from a pressure source such as an air compressor, a vacuum pump, or a vent to the atmosphere. Water control valve 64 provides flow for an initial filling of the condensate tray 55. Drain valve 66 provides drainage for overflow from the condensate tray and for cleaning of pressure vessel 67.

In a representative cooking process which illustrates evaporative cooling of hot containers, securable lid 68 is opened and containers 70 and 71 are placed within the pressure-chamber. The lid is secured and the computer is programmed to provide temperature and pressure setpoints through the processing cycle. An initial heating phase includes positioning selector valves 42A and 42B and regulator valve 43 to admit flow of hot thermal exchange fluid through the primary heat exchanger 41, positioning selector valves 52A and 52B and regulator valve 53 to admit flow of hot thermal exchange fluid through the secondary heat exchanger 51, and operating fan 60 at full speed to rapidly heat the pressure chamber. Water control valve 64 opens to fill the condensate tray 55 for vaporization of the condensate by the secondary heat exchanger 51. Pressure regulator valve 63 momentarily opens to vent gases from the pressure chamber thereby reducing the partial pressure of air. Flow of thermal exchange fluid through the primary heat exchanger 41 is regulated in response to temperature sensor 45 and flow of thermal exchange fluid through secondary heat exchanger 51 is regulated in response to pressure sensor 46 to maintain programmed pressures and temperatures.

After the heating phase has been completed, the computer generates setpoints for rapid cooling. Regulator valve 43 closes, selector valves 52A and 52B are positioned to admit cool thermal exchange fluid from the auxiliary heat sink, and regulator valve 53 opens. The fan operates at full speed in a direction which opens damper 57. Steam condensing on the secondary heat exchanger 51 flows into the condensate tray 55. Condensate flow controller 58 operates as a regulator valve to admit condensate into conduit 73. When the condensate flow controller 58 is open, condensate flows into the fan 60 which is rotating at a slow speed to project condensate droplets into trajectories which include a substantial portion of the containers 70 and 71.

Figure 3:
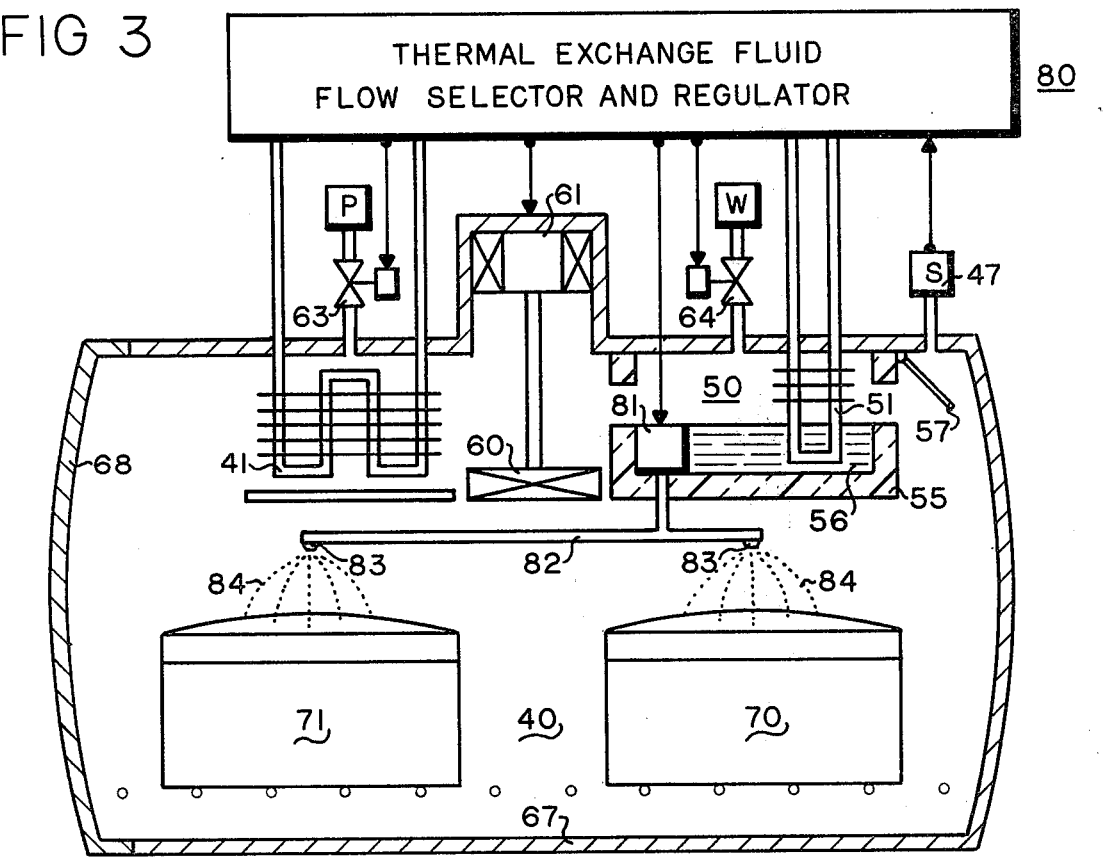
FIG. 3 is a schematic drawing partly in side cross section showing a pressure vessel having a heat exchanger to condense working fluid vapor and a pump to force working fluid condensate through conduits having orifices over the containers to form condensate droplets which deposit on the containers and vaporize therefrom.

FIG. 3 shows evaporative cooling of containers wherein a working fluid condensate is transported to the containers by a pump, conduits, and spray orifices.

Pressure chamber 40 and its contents are heated by primary heat exchanger 41 and working fluid is vaporized by secondary heat exchanger 51. Heat exchangers 41 and 51 are parts of a fluid circuit which is completed by thermal exchange fluid flow selector and regulator 80 as had been described with reference to FIG. 2.

After a heating phase is completed, secondary heat exchanger 51 receives cool thermal exchange fluid and fan 60 operates to force gases and vapors through vapor pressure control assembly 50. Working fluid vapors condense on cool surfaces of the secondary heat exchanger 51 and accumulate as a body of condensate 56. Pump 81 operates to force the condensate through conduits 82 and through spray orifices 83 which are positioned to provide a spray 84 of the condensate upon the containers 70 and 71. The working fluid droplets vaporize from and cool the containers. The vapor then condenses on the cool surface of the secondary heat exchanger to continue cyclically evaporative cooling of the containers.

Figure 4:
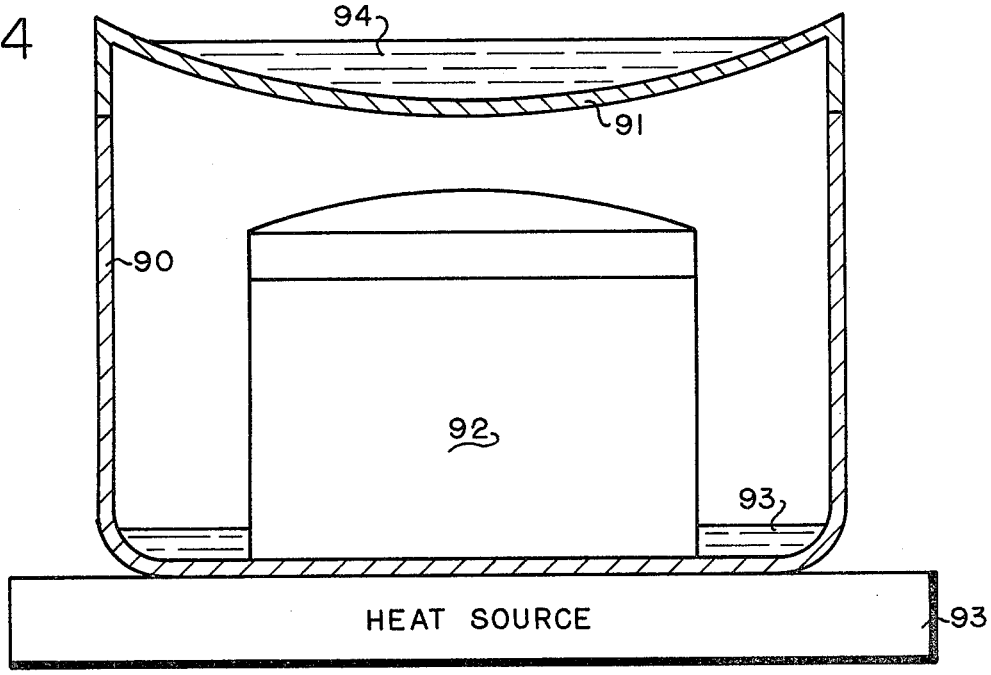
FIG. 4 is a schematic drawing partly in side cross section showing a pressure vessel enclosing a container and a working fluid and having a lid onto which cool water can flow to provide a cool surface in the pressure vessel to condense vapor of the working fluid for transport by gravity induced flow to the container for vaporization therefrom.

In FIG. 4, a pressure vessel 90 having a securable lid 91 encloses a container 92 and a working fluid condensate 93. The pressure vessel is placed on a heat source 93 which heats the container by condensation of the working fluid thereon and by heat conduction. When a heating phase is completed, the pressure vessel is removed from the heat source and a coolant 94, such as water, flows into a concavity in the lid 91. Working fluid vapor condenses within the pressure on the surface cooled by the coolant, flows to the lowest portion of the lid, and drops onto the container. The working fluid condensate vaporizes from the container to provide cooling and the working fluid vapor condenses on the cool surface in a cyclic process.

What I claim is:

1. A process for cooling a food substance in a container which is within a pressure vessel, comprising the steps of:

enclosing a food substance within a container having a removable cover, enclosing said container and a working fluid condensate within a pressure vessel having a securable lid and securing the lid, heating the container to a temperature sufficient to vaporize the working fluid and to process the food substance enclosed therein, cooling a surface within the pressure vessel to a temperature which is sufficiently low to condense vapors of the working fluid back to the working fluid condensate, transporting the working fluid condensate onto the container for vaporization therefrom for a time sufficient to cool the container and the food substance therein to a temperature below the atmospheric boiling point of water thereby enabling opening of the container at atmospheric pressure, and opening the securable lid of the pressure vessel, removing the container from the pressure vessel, removing the cover from the container, and removing the food substance from the container.

2. The process of claim 1 wherein the step of transporting the condensate comprises a capillary flow of the condensate into a wick covering at least a portion of the container.

3. The process of claim 1 wherein the step of transporting the condensate comprises projecting the condensate into trajectories which include a substantial portion of the container.

4. The process of claim 3 wherein the step of projecting the condensate into trajectories comprises delivering the condensate to a rotating body for projection into the trajectories by centrifugal force.

5. The process of claim 3 wherein the step of projecting the condensate into trajectories comprises delivering the condensate to a pump thereby developing a pressure to force the condensate through an orifice for projection into the trajectories.

6. The process of claim 1 wherein the step of transporting the condensate comprises positioning the container below a convex cooled surface thereby enabling the condensate to flow downward to a low portion of the cool surface and to drop onto the container.

7. The process of claim 1 wherein the step of heating the container includes vaporizing the working fluid condensate on a hot surface within the pressure vessel for condensation on the container thereby heating and cooling the container with the same working fluid substance.

8. The process of claim 1 wherein the step of cooling the surface within the pressure vessel to condense the working fluid thereon comprises cooling a thermal exchange fluid and transporting the cooled thermal exchange fluid to exchange heat with the surface.

9. The process of claim 1 wherein the step of heating the container comprises heating a thermal exchange fluid and transporting the heated thermal exchange fluid to exchange heat with a surface within the pressure vessel from which surface heat is transferred to the container.

10. The process of claim 2 wherein the step of heating the container comprises vaporizing the condensate on a hot surface within the pressure vessel for condensation on the container thereby providing rapid heating of the container to complement the rapid cooling by vaporization of condensate which is transported by the wick.

11. The process of claim 10 wherein
the hot surface is heated by transferring heat to a thermal exchange fluid and transporting the heated thermal exchange fluid to exchange heat with the hot surface, and
the cooled surface is cooled by transferring heat from a thermal exchange fluid and transporting the cooled thermal exchange fluid to exchange heat with the cooled surface.

12. The process of claim 11 wherein the hot surface and the cold surface are the same surface receiving the heated and cooled thermal exchange fluid at different phases of a processing cycle thereby allowing use of a common heat exchanging surface and a common body of thermal exchange fluid for heating and cooling.

13. The process of claim 1 comprising the additional step of releasing at least a portion of a noncondensable gas from the pressure vessel thereby reducing the boiling point of the working fluid condensate within the pressure vessel below its atmospheric boiling point.

14. The process of claim 13 wherein the working fluid is water thereby enabling cooling of the container and the food substance therein below the atmospheric boiling point of water.

15. Apparatus for cooling a container in a pressure vessel, comprising:
a passive pressure container having a cover which can be removed to admit and remove a substance from the container,
a pressure vessel having a securable lid which can be opened to admit and to remove the container,
a working fluid within the pressure vessel, said working fluid having substantial latent heat of vaporization and vapor pressure at predetermined operating temperatures,
means for heating the container within the pressure vessel to said operating temperatures,
means for cooling a surface within the pressure vessel to temperatures sufficiently low to condense vapors of the working fluid thereon to provide a body of working fluid condensate, and
means for transporting the working fluid condensate to the container for vaporization therefrom and cooling thereof, said vaporized working fluid being condensed again on the cool surface for transport to and cooling of the container whereby the container is cooled for removal from the pressure vessel and the substance is cooled for removal from the container.

16. The apparatus of claim 15 wherein the means for transporting the working fluid condensate to the container comprises a wick partly immersed in a body of the working fluid condensate, said wick covering at least a portion of the container for vaporization of the working fluid condensate from said covered portion.

17. The apparatus of claim 15 wherein the means for transporting the working fluid condensate comprises means for projecting the working fluid condensate into trajectories which include a substantial portion of the container from which container the working fluid condensate vaporizes.

18. The apparatus of claim 17 wherein the means for projecting the working fluid condensate into trajectories comprises a rotating body which projects the working fluid condensate by centrifugal force.

19. The apparatus of claim 17 wherein the means for projecting the work fluid condensate into trajectories comprises a pump to develop a pressure on the condensate and an orifice to receive the condensate under pressure to direct the condensate toward the containers.

20. The apparatus of claim 15 wherein the means for transporting the work fluid condensate and to cool the surface within the pressure vessel comprises a curved upper portion of the pressure vessel having a concave outer surface to receive a flow of a coolant and having a convex inner surface within the pressure vessel cooled by the coolant to guide working fluid condensing thereon to a lower portion to drop onto a container positioned below the lower portion of the convex surface.

21. The apparatus of claim 15 wherein the means for cooling the surface within the pressure vessel comprises a thermal exchange fluid, means separate from the pressure vessel to cool the thermal exchange fluid, and a fluid circuit to transport the thermal exchange fluid to exchange heat with the cool surface and the means for cooling the thermal exchange fluid.

22. The apparatus of claim 21 wherein the means for cooling the thermal exchange fluid is an auxiliary heat sink.

23. The apparatus of claim 15 wherein the means for heating the container comprises means for transporting the working fluid condensate to a heated surface within the pressure vessel thereby vaporizing the working fluid condensate for condensation on the container so that the same working fluid is used for both heating and cooling the container.

24. The apparatus of claim 23 wherein the heated surface is heated by means comprising a thermal exchange fluid, means separate from the pressure vessel for heating the thermal exchange fluid, and a fluid circuit to transport the thermal exchange fluid to exchange heat with the heated surface and the means for heating the thermal exchange fluid.

25. The apparatus of claim 24 wherein the means for heating the thermal exchange fluid comprises a hot reservoir.

26. The apparatus of claim 24 wherein the means for cooling the cool surface within the pressure vessel comprises the thermal exchange fluid, means separate from the pressure vessel for cooling the thermal exchange fluid, and another fluid circuit to transport the thermal exchange fluid to exchange heat with the cool surface and the means to cool the thermal exchange fluid thereby using the same thermal exchange fluid selected from different fluid circuits to heat and cool the pressure vessel.

27. The apparatus of claim 26 wherein the thermal exchange fluid is a liquid phase fluid.

28. The apparatus of claim 16 wherein the cool surface is located at a bottom portion of the pressure vessel on which the container is positioned to immerse the wick in condensate on the bottom portion of the pressure vessel.

29. The apparatus of claim 28 wherein the means for heating the container comprises a heated surface at a bottom portion of the pressure vessel to which the working fluid condensate flows for vaporization therefrom and condensation on the container thereby using the same working fluid for heating and cooling of the container.

30. The apparatus of claim 29 wherein the cool bottom surface and the heated bottom surface of the pressure vessel are a common surface which is heated and cooled alternately.

31. The apparatus of claim 30 wherein the common surface is cooled and heated by a thermal exchange fluid which is heated and cooled by a heat source and a heat sink separate from the pressure vessel.

32. The apparatus of claim 15 further comprising means for releasing at least a portion of a noncondensable gas from the pressure vessel thereby reducing the boiling point of the working fluid condensate within the pressure vessel below its atmospheric boiling point.

33. A process for cooling a container within a pressure vessel, comprising the steps of:
enclosing a container and a working fluid condensate within a pressure vessel,
heating a surface within the pressure vessel by transferring heat to a thermal exchange fluid and transporting the heated thermal exchange fluid to exchange heat with the surface thereby providing a hot surface within the pressure vessel,
vaporizing the working fluid condensate on the hot surface for condensation on the container for rapid heating thereof,
cooling a surface within the pressure vessel by cooling a thermal exchange fluid and transporting the cooled thermal exchange fluid to exchange heat with the surface thereby providing a cool surface within the pressure vessel whereupon to condense the vapor of the working fluid back to the working fluid condensate, and
transporting the working fluid condensate to a wick covering at least a portion of the container whereby the working fluid condensate vaporizes therefrom to cool the container and to condense on the cool surface to be transported back to the wick.

34. Apparatus for cooling a container in a pressure vessel, comprising:
a pressure vessel which encloses a container for heating and cooling thereof,
a working fluid condensate withing the pressure vessel which vaporizes at operating temperatures within the pressure vessel,
a hot reservoir separate from the pressure vessel, a thermal exchange fluid, a fluid circuit for transporting the thermal exchange fluid between the hot reservoir and a surface within the pressure vessel to provide a heated surface, and means for transporting the working fluid condensate to the heated surface thereby vaporizing the working fluid condensate for condensation on and heating of the container,
means for cooling a surface within the pressure vessel to provide a cooled surface for condensing the vaporized working fluid into a working fluid condensate, and
means for transporting the working fluid condensate to the container for vaporization therefrom and cooling thereof said vaporized working fluid condensing again on the cooled surface for transport to the containers.

35. The apparatus of claim 34 wherein the means for cooling the cooled surface within the pressure vessel comprises the thermal exchange fluid, means separate from the pressure vessel for cooling the thermal exchange fluid, and another fluid circuit for transporting the thermal exchange fluid for exchanging heat with the cooled surface and the means for cooling the thermal exchange fluid thereby using the same thermal fluid selected from different fluid circuits for heating and cooling the pressure vessel.

36. The apparatus of claim 35 wherein the thermal exchange fluid is a liquid phase fluid.

37. The apparatus of claim 34 wherein:
the cooled surface is located at a bottom portion of the pressure vessel whereupon the working fluid condenses and collects,
the means for transporting the working fluid condensate to the container comprises a wick covering at least a portion of the container, and the wick is partly immersed in the working fluid condensate at the bottom of the pressure vessel.

38. The apparatus of claim 37 wherein the heated surface which vaporizes the working fluid condensate is located at a bottom portion of the pressure vessel to which the condensate flows and vaporizes for condensation on the container.

39. The apparatus of claim 38 wherein the cooled bottom surface and the heated bottom surface of the pressure vessel are a common surface which is heated and cooled alternately.

40. The apparatus of claim 39 wherein the common surface is cooled and heated by a thermal exchange fluid which is heated and cooled by a heat source and a heat sink which are separate from the pressure vessel.

* * * * *